US010403067B2

(12) United States Patent
Niles (10) Patent No.: US 10,403,067 B2
(45) Date of Patent: Sep. 3, 2019

(54) SYSTEM AND METHOD FOR MOBILE BASE STATION AUTHENTICATION

(71) Applicant: TELUS Communications Inc., Vancouver (CA)

(72) Inventor: Denis Niles, Ottawa (CA)

(73) Assignee: TELUS Communications Inc., Vancouver (CA)

( * ) Notice: Subject to any disclaimer, the term of this patent is extended or adjusted under 35 U.S.C. 154(b) by 0 days.

(21) Appl. No.: 16/192,606

(22) Filed: Nov. 15, 2018

(65) Prior Publication Data

US 2019/0236870 A1    Aug. 1, 2019

Related U.S. Application Data

(63) Continuation-in-part of application No. 15/886,689, filed on Feb. 1, 2018.

(51) Int. Cl.
| | |
|---|---|
| *H04M 1/66* | (2006.01) |
| *G07C 9/00* | (2006.01) |
| *H04W 12/06* | (2009.01) |
| *H04W 4/029* | (2018.01) |
| *H04W 48/04* | (2009.01) |

(52) U.S. Cl.
CPC ......... *G07C 9/00119* (2013.01); *H04W 4/029* (2018.02); *H04W 12/0608* (2019.01); *H04W 48/04* (2013.01)

(58) Field of Classification Search
CPC . H04W 48/04; H04L 63/0853; H04L 63/0876
See application file for complete search history.

(56) References Cited

U.S. PATENT DOCUMENTS

| | | | | |
|---|---|---|---|---|
| 9,485,237 | B1* | 11/2016 | Johansson | H04L 63/08 |
| 2011/0276676 | A1* | 11/2011 | Kang | H04L 67/04 709/223 |
| 2013/0260710 | A1* | 10/2013 | H R | H04L 63/101 455/404.1 |
| 2014/0071925 | A1* | 3/2014 | Liu | H04W 28/08 370/329 |
| 2014/0189808 | A1* | 7/2014 | Mahaffey | H04L 63/083 726/4 |
| 2015/0024710 | A1* | 1/2015 | Becker | H04W 12/06 455/411 |
| 2015/0131483 | A1* | 5/2015 | Colban | H04W 48/16 370/254 |
| 2016/0055697 | A1* | 2/2016 | Raina | G07C 9/00111 340/5.7 |
| 2016/0110652 | A1* | 4/2016 | Meredith | G06N 7/005 706/52 |
| 2017/0236124 | A1* | 8/2017 | Wagner | G06Q 20/3224 705/44 |

* cited by examiner

*Primary Examiner* — Barry W Taylor
(74) *Attorney, Agent, or Firm* — Christensen O'Connor Johnson Kindness, PLLC (57) ABSTRACT

A system and method for increasing the security of a secure resource by determining a current location of a mobile device associated with an end user based on determining the mobile base station to which the mobile device is connected and allowing access to the resource only if an end user has access credentials to access the resource and the physical location of secure resource matches the current location of the mobile device.

4 Claims, 6 Drawing Sheets

SYSTEM AND METHOD FOR MOBILE BASE STATION AUTHENTICATION

TECHNICAL FIELD

The disclosed systems and methods relate to using location information to determine whether to grant a user physical and/or logical access to a location, an object or a system. In particular, the disclosed systems and methods relate to providing location-based authentication using connectivity information from mobile base stations.

BACKGROUND

Some previous attempts to use mobile device location information to make decisions regarding security access have drawbacks.

GPS systems are commonly used to provide location information, however, those systems require GPS to run, which uses battery power to operate and require additional processes, such as a GPS application, to operate. Moreover, GPS may not operate well in buildings or vehicles due to poor transmission of GPS signals. In many cases, a GPS signal is not available due to some sort of interference (naturally occurring or man-made).

Running GPS may also compromise an end user's privacy. Mobile device original equipment manufacturers (OEMs) and many application developers often make use of GPS function for uses that invades an individual's privacy without the end user's explicit knowledge. Moreover, if a mobile device is impacted by malware, the GPS function could add more info details for attackers to locate the end user and thus compromise their security. Many mobile apps demand/require access to GPS data which again weakens one's ability to limit who is tracking them.

Other systems for providing location information rely on systems such as WiFi connection (or WLAN), a wireless beacon or a relay device in the immediate vicinity of the access location, such as at the ground floor entrance of a building. These types of systems generally require some form of digital ID on the mobile device, such as a smartphone, to be mapped or authenticated to the local wireless network which implies WiFi app or modem needs to be enabled by the end user. Users may often not have their mobile device set to have WiFi enabled or "ON", and the use of WiFi will often drain battery usage. This is the similar scenario when attempting to use another wireless technology such as Bluetooth and Bluetooth Low Energy as both these wirelesses technologies also require apps on the device, an enabled modem and a pairing to the local Bluetooth server. In all of these types of systems, the smartphone itself, loaded and configured apps, and a specific modem turned "ON" are necessary to enable access.

Applications that use wireless connections to determination location generally require the smartphone to have an installed application on the device to communicate with the wireless service provider to transmit its position. The service provider needs to provide an application program interface (API) of some kind that would define how to receive the coordinates from the smartphone and where/how to transmit them to the electronic access control unit. Additionally, in this type of system, the geo-location info is often the sole method provided to enable door access without requiring additional identification of the individual. This also may mean added complexity for providing access services and additional drain on the mobile device since an app and other mobile modules are required to establish connectivity.

Other systems require a mobile device to provide identification information to an external service which uses the information to locate the individual. This type of solution is invasive since the end user's devices are required to communicate with an external tracking system to enable location services. These types of system will similarly often require an invasion of the end user's privacy.

Some previous location verification systems require a user to call an authentication server which then verifies their voice print, and then the authentication server queries the wireless provider to acquire the location of the phone. Requesting a person's location from a wireless provider may not be permissible in various jurisdictions due to privacy laws which often forbids providers from tracking customers unless there is a request by law enforcement.

Other systems may attempt to use triangulation through cellular signal strength measurements, but will also often require the installation of an application on the mobile device.

SUMMARY

There is provided in one embodiment a method of authenticating an end user's access to a resource at a physical location using a resource access system in communication with a mobile network including a plurality of base stations. The resource access system receives a request from the end user to be permitted to access the resource. The resource access system determines whether the end user has access credentials to access the resource. The resource access system requests and receives information from a subscriber server for the mobile network including subscriber data associated with the mobile device. The subscriber data includes information obtained from the plurality of base stations indicating which one of the plurality of base stations the mobile device is currently connected. The resource access system verifies a current location of the mobile device based on the one of the plurality of base stations to which the mobile device is connected. The resource access system allows access to the resource only if the end user has access credentials to access the resource and the physical location matches the current location of the mobile device.

In another embodiment there is also a system for providing an end user access to a secure resource. There is a resource access system in communication with a mobile network database. An access database is connected to and accessible by the resource access system. The resource access system is configured to determine whether the end user has access credentials to access the resource based on information stored in the access database. The resource access system is configured to communicate with the mobile network database to obtain subscriber data associated with a mobile device associated with the end user in response to the resource access system receiving a request from the user to access the secure resource. The subscriber data includes information obtained from a base station, the information indicating that the mobile device is currently connected to the base station.

In another embodiment there is a method of authenticating an end user's access to a resource at a physical location using a resource access system in communication with a communications network including a base station. The method may be performed by the resource access system. A request from the end user to be permitted to access the resource is received from the resource access system. The resource access system determines whether the end user has access credentials to access the resource. The resource access system requests and receives information from the communications network including subscriber data associated with the mobile device. The subscriber data includes information identifying that the mobile device is connected to the base station. The resources access system verifies a current location of the mobile device based on identifying information of the base station to which the mobile device is connected. The resource access systems allowing access to the resource only if the end user has access credentials to access the resource and the physical location matches the current location of the mobile device.

In one embodiment, smart card technology, smartphone and Telecom Service Provider base station data/information is used and mapped together with a resource access system (physical or logical oriented) for the purpose of increasing authentication sources for physical and/or logical access, thus increasing the security level for access.

In some embodiments, this technology could be implemented by a business or corporation which mandates this process for access to its premises and/or computer systems. End user employees of the company would then register their device or devices for this added secure access service. User access, for physical or logical purposes, would be based on a primary function or rule of access always "disabled" until the mobile device connects to the specific base station which is identified as the primary and/or closest access point to the asset, such as a building door or specific computer terminal.

In some embodiments, the system and method use mapping information from two distinct disparate data sources to increase the authentication factor for access services.

These and other aspects of the system and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

In an embodiment, the method operates as follows:
a. Smartphones connect to mobile towers and base stations;
b. When a Smartphone is connected to a particular base station, that information is known to the backend mobility systems via its IMSI and/or other device identifying data;
c. If that base station is the primary or closest base station to the targeted physical building or computer terminal for access purposes, that base station will be the prime mobility node where a connected device's ID would be retrieved from mobility backend systems and sent the resource access system to be mapped against a smart card ID and/or user logical access credentials;
d. When the mobile device's ID, retrieved from the specific mobile base station, is sent to the access system and mapped to the user ID, the smart card system identifies the door which this user has access to (as per his/her access profile) and "enables" it for card access, or in the case of logical access, the mobile device's ID is mapped to the corporate logical access system to enable access to a specific computer terminal.

In some embodiments, the proposed systems and methods may provide certain benefits. No client app is required on the mobile devices. This means, unlike many services/solutions for mobile devices, battery power is not affected since mobile base station connectivity is always working. The proposed systems and methods do not require determining:
a. Location based on GPS receiver within the mobile device;
b. Location based on signal strength between mobile device and cell tower; or
c. Location based on signal triangulation from multiple cell towers.

Embodiments of the system and method may use, for example, a smartphone or a smart card with a digital ID as a primary secure access device and the RAN base station is the secondary form factor that enables the primary secure device to enable access.

Figure 1:
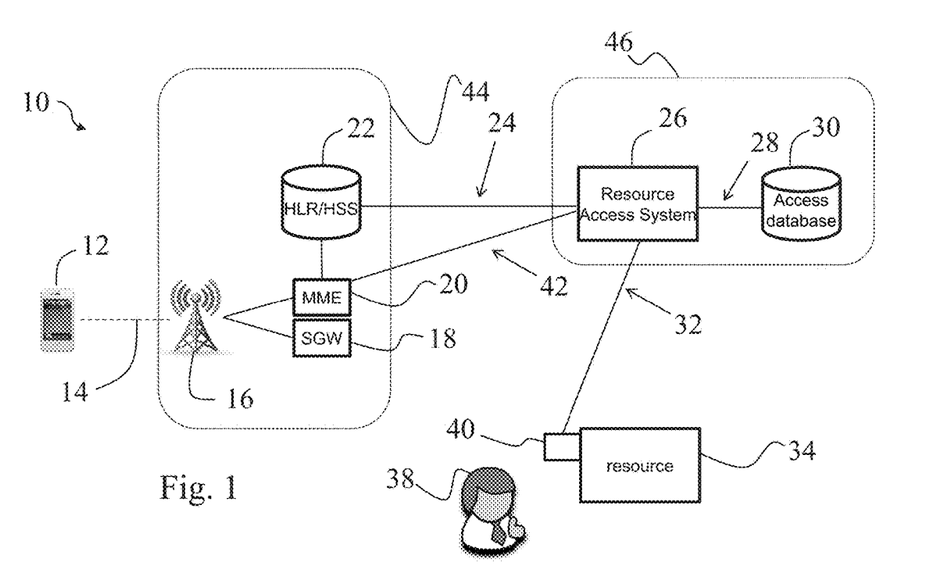
FIG. 1 is a schematic diagram of an authentication system using mobile base stations.

In an exemplary embodiment, FIG. 1 shows an authentication system 10. A mobile device 12 is connected to a mobile network through connection 14 to a base station 16, which is shown as a mobile base station tower. The base station 16 connects to a serving gateway (SGW) 18 and mobile management entity (MME) 20. A home location register (HLR)/home subscriber server (HSS) 22 is connected to the SGW and stores subscriber data associated with users of the mobile network. Collectively, the cellular base station 16, the MME 20 and the HLR/HSS 22 form the telco environment or evolved packet core 44. The telecom environment 44 is operated or controlled by the telecommunications company that provides connectivity to the mobile device. The subscriber data can include information regarding the international mobile subscriber identity (IMSI), the integrated circuit card ID (ICCID) and/or the international mobile equipment identity (IMEI) or other information that identifies the mobile device with an end user.

Figure 2:
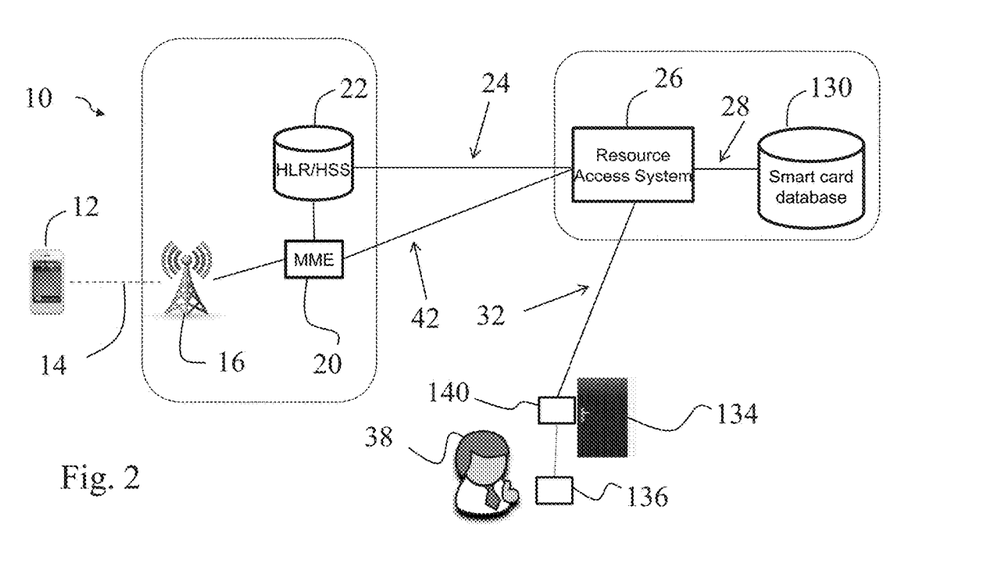
FIG. 2 is a schematic diagram of a smart card authentication system using mobile base stations.

The mobile subscriber information is provided to a resource access system 26 through a connection 24. Base station identification information may be provided to the resource access system 26 through a connection 42. Although connections 24 and 42 are shown as two separate connections, information from the telco environment 44 may be communicated to the resource access system through a single or higher number of connections. The resource access system 26 is connected to an access database 30 through a connection 28. Collectively, the resource access system 26 and the access database 30 form a resource access system environment 46. Primary authentication may be provided using a smart card as shown in FIG. 2, in which case the resource access system 26 is a smart card access system and the access database 30 is a smart card database 130. Subscriber data from the mobile network may be mapped to smart card IDs in the resource access system 26. The resource access system 26 controls access to a resource 34. The resource may be either an object or a place that the user may need physical access to or may be a system that the user requires logical access to. For example, the resource may be a door 134 (FIG. 2) which can have access enabled by the resource access system 26. The resource 34 may also be a computer system, a vehicle, a turnstile, a parking garage, personal internet of things (IoT) devices or any other accessible resource which may require access credentials such as a password, a smart card and/or a biometric value to access. The use of a cellular base station ID associated with the mobile device is used in this method as another factor to increase the security for the access request.

A resource access device 40 communicates with the resource access system 26 through connection 32. A user 38 may request access to the resource 34 and may use access credentials as a primary method of authentication, and the access credentials may be a smart card 136 (FIG. 2). The user 38 may be an employee of a corporation that uses the smart card 136 (FIG. 2) to access building after access has been granted based on the location information retrieved from the base station 16 and processed by the resource access system 26.

From the user's perspective, the user 38 attempts to access the resource 34, which may be a computer access terminal or a door 134 (FIG. 2) or other resource having restricted access. To access the resource, the user may either enter identification information, such as a username and password, or use a security token such as a smart card at a resource access device 40. The resource access device 40 may be a smart card reader 140 (FIG. 2), and the smart card 136 may be read by the smart card reader 140 as shown in FIG. 2. The resource access system 26 will then confirm that the smart card or other identification information is correct and matches to a user having security clearance to access the resource. At the same time, the resource access system 26 will determine whether the mobile device associated with the user is at a location that is consistent with the physical location of the resource. Subscriber information from the mobile network that allows for the identification of the location of the mobile device is provided to the resource access system 26. This information may include information showing that the mobile device associated with the user 38 is connected to a particular base station. If the physical location is nearest to one particular base station, then the verification that the user is at the correct location may be provided by confirming that the mobile device associated with the user is connected to the particular base station near the access point. Information regarding which mobile base station is closest to the resource may be stored by the resource access system 26. Alternatively, the resource access system may store a list of all of the mobile base stations IDs that correspond to base stations that are close enough to provide connectivity to a mobile device at the specific location of the resource.

The resource access device 40 may be any device that can send credential information such as identification information or information associated with a security token to the resource access system and receive signals from the resource access system to enable or disable access to the resource. For example, if the resource is a computer, the resource access device 40 may be in the form of software or hardware implemented on the computer itself. If the resource is a door, the resource access device 40 may be a smart card reader or terminal into which a password and/or user name are entered. The resource access device 40 must have sufficient functionality to communicate with the resource access system 26 in order to allow access to the resource based on information from the teleco environment associated with the mobile device and the validity of the access credentials.

If the resource access system 26 determines that the user has met the authentication requirements to access the resource and the location information determined from the mobile network are consistent with the user being at the physical location of the resource, then access will be granted. The system does not require the user to install an application to determine the location of the mobile device or phone. The mobile device location is determined directly using the subscriber information from the mobile network which is communicated to the resource access system.

An exemplary implementation of the system 10 in FIG. 1 is set out as follows. The user's mobile device, such as a phone, connects to the tower and base station 16. The international mobile subscriber identity (IMSI) data associated with the user's phone is sent from the home location register (HLR) to the resource access system 26, which may be a smart card access system 26 as shown in the embodiment in FIG. 2. The IMSI data is mapped to a smart card ID in the card access system 26. If the information associated with the IMSI data and smart card ID correspond with the required inputs, then the card access system sets the access state for the secure resource, such as the door 134, to "enabled". The employee uses the smart card to access building and the access is granted based on the ID retrieved from base station. During the operation of the method in this example, the resource access is always disabled until input from HLR is received to enable door access for the specific employee. In this example, the employee's phone does not communicate directly to the resource access system and no private information is communicated directly from the employee's phone.

The user will register their device with the resource access system by using their name and the IMSI value of their device. This information can be updated in the access database whenever any of the data associated with the user is modified.

An exemplary method of implementing the system with reference to FIG. 2 is set out as follows. The end user 28 has a mobile device 12 which connects to tower and cellular base station 16 using IMSI data 14. The end user mobile device IMSI data and cellular base station ID or Base Station Identity Code (BSIC) are sent to the MME 20. The end user mobile device IMSI data and BSIC are sent to the resource access system 26 through communication channel 42. The resource access system 26 retrieves subscriber name information associated with the specific IMSI data from the HLR/HSS 22. The mobile device IMSI, subscriber name and base station ID is received from the telecommunications company. The resource access system 26 retrieves IMSI, smart card user name, smart card ID# base station ID and smart card reader ID from the smart card database 130 and maps this data to the mobile device subscriber information. If a mapping between the smart card user name and the stored IMSI and a mobile device subscriber name and the associated IMSI is not achieved, the smart card reader 140 is disabled for the end user and the end user is not permitted to access the resource. If the resource access system 26 determines that the subscriber information for the end user 38 matches the smart card user name and the corresponding IMSI and the BSIC of the mobile base station corresponds to a location that is close to the location of the resource 34, then the smart card reader 140 is set to enabled status for the end user which allows them to utilize their smart card to access the building. The smart card reader 140 for access to the resource, such as the door 134, is always set to "Disabled" status until input from MME including the base station ID is received to "Enable" door access for End User for a set period of time.

The resource access system retrieves the IMSI value, the smart card user name, the smart card ID#, the BSIC and the Smart Card Reader ID# from the database 130. The retrieved values are compared to the mobile device IMSI, subscriber name and BSIC retrieved from the telecommunications company. The base station ID is a value that is stored in the access database 30 such as the smart card database 130 (FIG. 2). The base station ID and the resource access device 40 such as the smart card reader 140 (FIG. 2) are mapped one-to-one. The base station IDs, device IMSIs and the subscriber names are registered in the access database. Any time that a new user is added who requires access to the resource, the database must be updated to include information for the new user. Similarly, if a new resource and resource access device is installed, updated information from the telecommunication company's network, such as closest base station ID and IMSI is included in the access database.

Mapping between the smart card user name and subscriber name can be compared in various ways. Limited subscriber information associated with the telecommunications network may be stored by the resource access system prior to any request for access being initiated within the system, such as the names of subscribers for the telecommunications network that correspond to individuals having access credentials stored in the access database. The physical locations of various base stations and their proximity to the resource can be provided to and stored in the resource access system 26. The IMSI # and account name from the telecommunications company may be mapped to an employee name with access to the resource that is registered in the resource access system. The IMSI data provides a unique identifier of the person with access even if there are identical names in the system. The IMSI data may be mapped to the specific smart card 136 or other access credentials 36 of the end user. The base station ID, which maps to the specific resource access device will ensure that only a specific resource access device is enabled for use when the information is sent from the telecommunications company.

Figure 5:
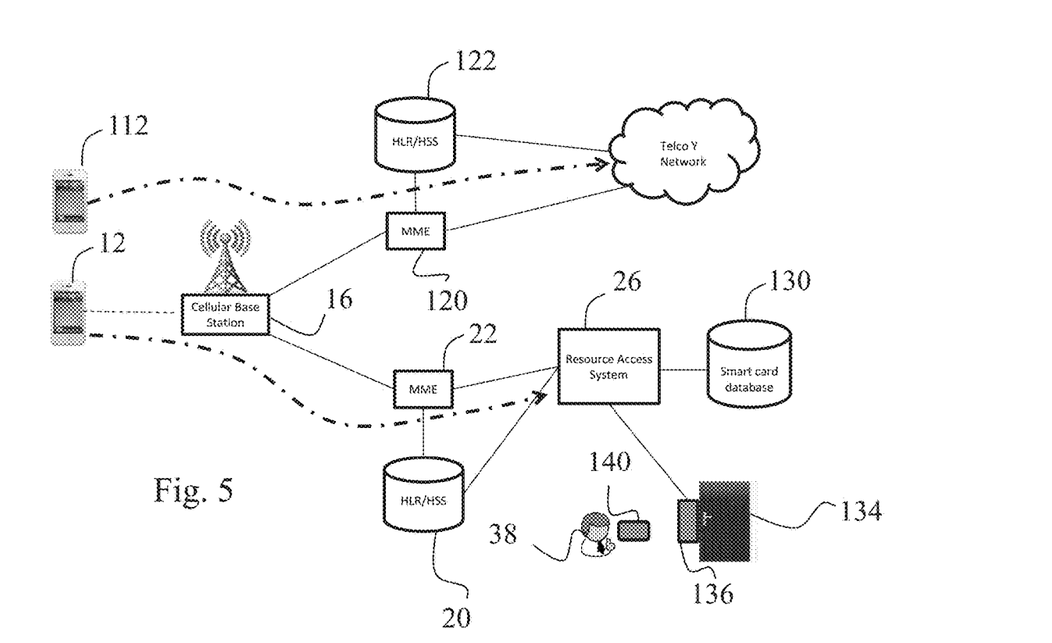
FIG. 5 is a schematic diagram of an authentication system showing use of a base station shared between multiple telecommunications companies.

FIG. 5 shows an embodiment where two different telecommunications companies share cell tower and base station infrastructure. Two mobile devices 12 and 112 connect to an individual cellular base station 16. Each telecommunications company has separate evolved packet core networks. One telecommunications company has HLR/HSS 122 and MME 120 and the second telecommunications company has HLR/HSS 22 and MME 20. In this example, the base station ID is the same for both mobile devices 12, 112 but the signal is routed to the specific telco MME 22 which the company implementing the resource access system 26 has a contract with. In some cases, more than one telco could in fact have the same base station ID in their respective MME but the end user's device IMSI would only connect to one of the telcos, thus the base station id-IMSI combo would be unique for that end user. Additionally, a company could have contracts with multiple telcos for this service, particularly if its buildings were in different regions where the same telco does not service both regions.

By tracking the user based on the end user's name and IMSI, there are no operational or update problems when users change smartphones which means that one does not need to set up their device to enable an app or other service.

Figure 6:
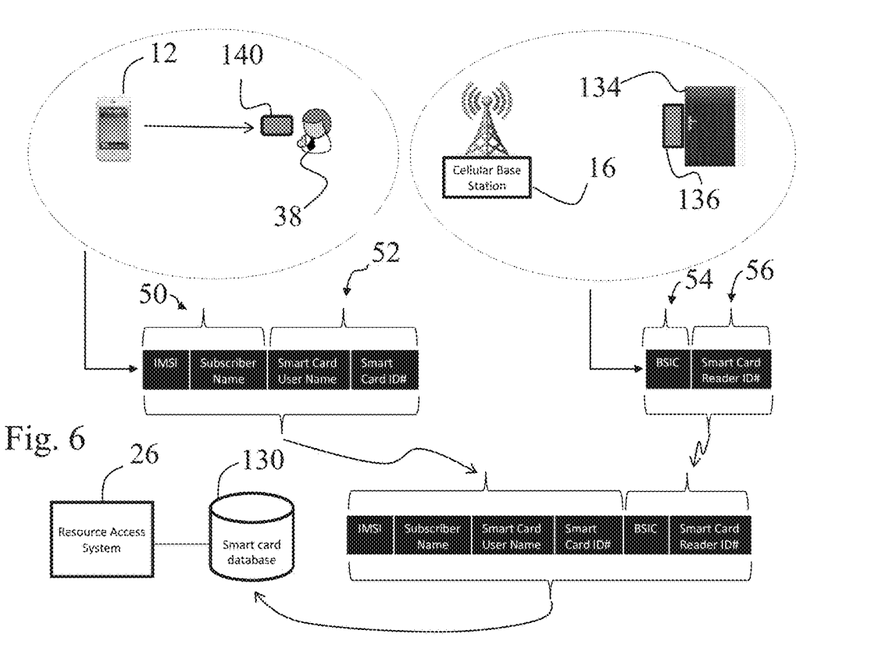
FIG. 6 is a schematic diagram showing information being shared within an authentication system.

FIG. 6 shows an exemplary embodiment of the information being shared between the telecommunications company and the resource access system. The mobile device IMSI is mapped one-to-one with the smart card ID#. The base station ID is mapped one-to-one with the smart card reader. The IMSI and subscriber name as shown at 50 are obtained from the telecommunications company. The smart card user name and smart card ID# as shown at 52 are obtained from the resource access system. The base station ID as shown at 54 is obtained from the telecommunication company and the smart card reader ID# as shown at 56 is obtained from the resource access system. The smart card database 130 stores each of the IMSI, subscriber name, smart card user name, smart card ID#, BSIC and smart card reader ID# which can be compared to information obtained when a request to access the resource is received in order to determine whether an individual should be allowed access to the resource at that time.

In some embodiments, a company which is providing dual authentication in accordance with the proposed systems and methods using mobile base station location information would enter into a contractual arrangement with a telecommunications provider to be able to acquire the local or nearest base station ID info. The company and/or the telco would need to work with access system to integrate the solution. In other embodiments, a company could install its own local cellular antenna and base station (i.e.—picocell or femtocell) such that they could have total control on the environment. If the resource is inside a building where cellular signals cannot penetrate, additional short distance antennas & base stations (like the ones mentioned above) could be installed to facilitate end user access to various services.

The schematic drawings shown in FIGS. 1, 2, 4 and 5 show exemplary implementations of the system. The system can be implemented in various ways, using various types of connections that communicate between the various systems and databases. Different configurations of the systems may be used to achieve the intended purposes. In particular, although various embodiments of the system describe access being provided by a smart card and smart card database, various other access credentials can be used with appropriate modifications to the system. The secure resource may be any access point for which access is restricted, including a door, a computer terminal, or any other system that has a specific location or that has an access terminal at a specific location. Although the end user is at times described as an employee, the person may be any end user, such as a visitor to the building who has been granted appropriate access so long as the mobile device associated with that user has been included in the system. The mobile device may be a smartphone or any other device that connects to a mobile network. Verifying a current location of the mobile device based on the one of the plurality of base stations to which the mobile device is connected may not require the resource access system to positively determine a location of the mobile device. The resource access system need only verify that the information representing the location of the device matches the required credentials specified by the system. The verification could, for example, be a Boolean response to an inquiry of whether the base station to which the mobile device is connected is the closest base station to the physical location of the resource. The location of user may be compared with the location of the specified mobile base station to which the end user's mobile device is connected to, and that information is included in the multi-factor access configuration that allows the user to access the resource.

Determining the base station to which the mobile device is connected may be determined by the resource access system communicating with the backend of a telecommunications network to determine the specific base station to which the mobile device is currently connected. For example, the resource access system may request the identification number associated with the base station, such as the Base Station Identity Code (BSIC). While mobile devices are on, they are connected to a base station, if a base station is available. The base station to which the mobile device is connected will be determined by the telecommunications network determining which base stations currently provide the best connection to the mobile device. That means that the base station to which a mobile device is connected will generally be the closest base station to the mobile phone. An approximate location of a mobile phone can be determined using the identification number of the base station to which a mobile device is currently connected. Determining the identification number of the base station does not require any application or other communication directly with the mobile device. Only information from the backend of the telecommunications provider is required. So long as the resource access system has information regarding the location of each base station, only the specific identity of the base station to which the mobile device is at that moment connected to is required in order to determine an approximate location of the mobile device.

In other embodiments, the telecommunications environment may include other cellular configurations where the network is not a Long-term evolution (LTE) network, but some other network, such as, for example, a High Speed Packet Access (HSPA)-based network. In that case, the MME is replaced by a collaboration between the RNC (Radio Network Controller) and SGSN (Serving GPRS Support Node) devices whereas the RNC ID would be utilized instead of the LTE's BSIC. The implementation of the systems and methods disclosed herein can be modified appropriately based on the type of network connection used. Furthermore, although the exemplary embodiment describes an MME system, the MME may evolve to something other than its current function or may be changed to a different system entirely. However, any similar system to MME may be used so long as the system is capable of tracking mobile devices, for example based on the physical location of cellular infrastructure as the mobile device geolocation moves. Similarly, although IMSI is used to uniquely identify the user's mobile device, as cellular networks evolve, other identification data may be used with the systems described herein. Also, since the IMSI data is uniquely associated with a particular user in the access database, it may be possible to operate the system without requiring the system to map the name of the user.

Figure 3:
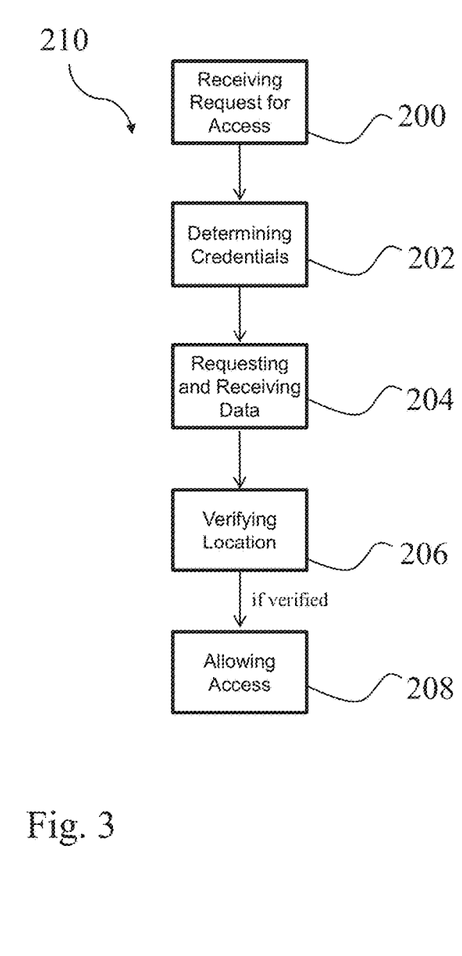
FIG. 3 is a flow diagram of a method of using a mobile base station to authenticate the location of a user.

In one embodiment, as shown in FIG. 3, there is a method 210 of authenticating an end user's access to a resource at a physical location using a resource access system in communication with a communications network including a base station. The method may be performed by the resource access system 26 (FIG. 1). At 200, a request from the end user to be permitted to access the resource is received from the resource access system. At 202, the resource access system determines whether the end user has access credentials to access the resource. At 204, the resource access system requests and receives information from the communications network including subscriber data associated with the mobile device. The subscriber data includes information identifying that the mobile device is connected to the base station. At 206, the resources access system verifies a current location of the mobile device based on identifying information of the base station to which the mobile device is connected. At 208, the resource access systems allowing access to the resource only if the end user has access credentials to access the resource and the physical location matches the current location of the mobile device. The resource access system can allow access to the resource by communicating with the resource access device 40.

Figure 4:
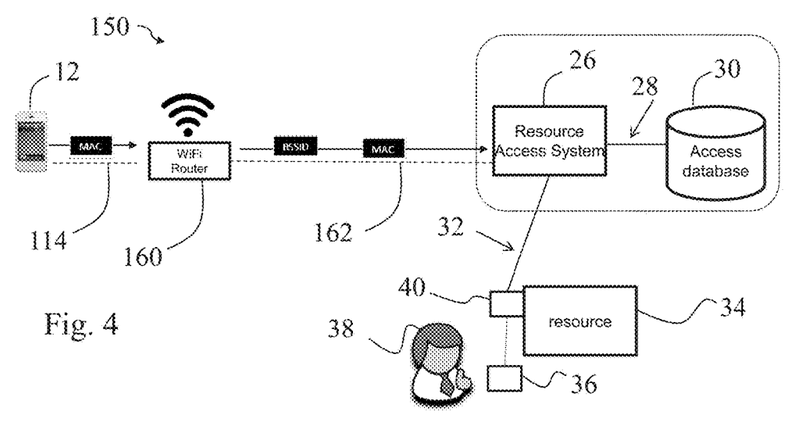
FIG. 4 is a schematic diagram of an authentication system using a WiFi router.

In one embodiment of the method shown in FIG. 3, the base station may be a mobile base station in a mobile network and the identifying information of the base station may be the Base Station Identity Code for the mobile base station as shown in FIG. 1. In another embodiment of the method of FIG. 3, the base station is a WiFi router and the identifying information of the base station is the base station ID for the WiFi router and the subscriber information comprises the MAC address of the mobile device as shown in FIG. 4.

Where the base station is a mobile base station in a mobile network, the method 210 set out in FIG. 3 may operate as follows. At 204, the resource access system requests and receives information from a subscriber server for the mobile network including subscriber data associated with the mobile device, the subscriber data includes information obtained from the plurality of base stations indicating which one of the plurality of base stations the mobile device is currently connected. At 206, the resource access system verifies a current location of the mobile device based on the one of the plurality of base stations to which the mobile device is connected. At 208, the resource access system allows access to the resource only if the end user has access credentials to access the resource and the physical location matches the current location of the mobile device.

By providing access to a resource using mobile base station information, the method and system can provide location information without the limitations of interference that may interrupt a GPS signal. A telecommunications provider can install a cellular antenna to connect to a base station for any location that is problematic for a GPS signal.

In an embodiment, making use of a cellular antenna and base station to capture location information could be arranged in advance with the telecom service provider and the access point owner (i.e. —private/corporate company or government organization). Use of this info, albeit transparent to the end user, would need to be negotiated ahead of time in the form of a request or arrangement whereas only when a person's smartphone is in a certain vicinity of the cellular antenna/base station would the individual be granted access. Privacy would not be affected since info captured from the smartphone is done so only when in that specific vicinity of the cell antenna/base station for a specific time-dependent purpose of access and the info would never be shared with any other external app (on the smartphone or backend system) for any other purpose, and whereas consent would be clear and understood by all parties using/supporting this service and this service only. It is intended that there would be no ulterior motive for this service and no info acquired from this service would be resold or utilized for any other reason than providing another factor of security for access purposes. Only specific pre-determined mobile devices may participate and be authorized to access the system.

The use of information from a mobile base station will not affect battery life, because unlike Wifi, Bluetooth, Bluetooth Low Energy or GPS, mobile connectivity is almost always on by default. Accordingly, smartphone info flowing through cellular means, from the mobile antenna and base station, does not affect the battery life of the smartphone or end device.

In some embodiments, the technology could be offered as "AaaS" (Access as a Service) to other manufacturers would want to offer augmented security via multi-factor access for their equipment or device such as vehicle, a lock to a residence whereas all would be equipped with cellular connectivity, and paired with the same base-station info to which their mobile phones are connected to in order to grant access.

In some embodiments where split knowledge and dual control are required, a secondary individual would also make use of this access method whereas both individuals would be required to have their mobile device connected to the telco base station to enhance the secure access to a particularly sensitive area/system. This could also be done even if the two individuals were in separate locations. For example, both individuals could separately attempt to access one or more resources using two different resource access devices 40 at different locations. The system could compare the locations of each of the individuals to the closest base stations to the resource access device at which each person is attempting access.

As will be understood, the resource access system can be connected to a plurality of different resource access devices each connected to separate resources or allowing access to the same resource from separate locations.

In the embodiment shown in FIG. 4, rather than a cellular mobile base station and associated MME & HLR/HSS, the system uses a WLAN base station (i.e. —WLAN router) in which case the method would use the BSSID (or Basic Service Set Identifier) of the router in lieu of the cellular BSIC (or Base Station Identity Code). The method would identification the location of the mobile device based on stored information about the location of the WLAN router. A WLAN access system could be implemented either by a telco or the company itself that is controlling access to the resource.

A system 150 which provides a location-based multi-factor access using a WiFi router 160 is shown in FIG. 4. In this embodiment, a mobile device media access control address (MAC address) may be registered with the resource access system 26 and mapped to the end user's name in the access database 30. Basic identification information associated with the WiFi Router 160, such as Basic Service Set Identifier (BSSID) or base station ID, is registered with the resource access system 26 which allows the MAC address data to map to the correct BSSID listed in the database.

The end user 38 has a mobile device 12 that has WiFi enabled. The mobile device 12 advertises the MAC address to the Wifi Router 160 through the connection 114, but does not need to connect to the WLAN. The end user mobile device MAC address and WLAN are sent to the resource access system 26. The resource access system 26 receives the BSSID and the associated MAC address from the WiFi router 160 through a connection 162. The BSSID is validated and the MAC address is mapped to a known end user in the access database 30. If access credentials 36 entered by the end user match the credentials stored in the access database 30 and the MAC address associated with the mobile device match MAC address for the end user that is stored in the access database, then the resource access device 40 is set to "Enable". The resource access device 40 is set to "Enabled" status based on the data received from the Wifi Router 160. If BSSID and/or MAC address are incorrect, the resource access device remains "disabled" and so the end user will not be able to access the system using the access credentials, which could be, for example, a Smart card with a Smart Card reader. For example, the Smart Card reader for door access may be set to "Disabled" status until input from WiFi Router is sent to Backend Access System to "Enable" door access for End User for a set period of time The resource access system as described in the methods and systems herein may be a computer, a server or any other device that can carry out the method steps described. The resource access system may be located at the same location as the resource or may be at a remote location away from the resource (as shown in FIG. 1). Each of the databases or access systems or other systems disclosed may be physical, virtual or cloud-based systems, or a combination of each, so long as each is capable of implementing the methods disclosed. In those cases where the systems are physical, the functionality described for each of the database or server or other systems may be implemented by a single piece of hardware at a specific location or may make use of multiple systems at separate locations. The database and systems themselves may be provided together on a single piece of hardware or multiple pieces of hardware. Connections between components in the system may be provided by wired connections, wireless connections or a combination of different types of connections as long as the require information can be quickly communicated within the system.

Immaterial modifications may be made to the embodiments described here without departing from what is covered by the claims.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method of authenticating an end user's access to a resource at a physical location using a resource access system in communication with a mobile network including a plurality of mobile base stations, the method being performed by the resource access system and comprising:

receiving a request from the end user to be permitted to access the resource;

determining whether the end user has access credentials to access the resource;

requesting and receiving information from a subscriber server for the mobile network including subscriber data associated with a mobile device associated with the end user, the subscriber data including information that identifies the mobile device with the end user;

requesting and receiving information from a backend system of the mobile network including information indicating a cellular base station identity code corresponding to a one of the plurality of mobile base stations to which the mobile device is currently connected;

mapping the subscriber data to the cellular base station identity code of the currently connected mobile base station;

verifying a current approximate location of the mobile device using the cellular base station identity code and verifying that the cellular base station identity code identifies a mobile base station near the resource; and allowing access to the resource only if the end user has access credentials to access the resource and the physical location matches the current approximate location of the mobile device.

2. The method of claim 1 in which the access credentials further comprises a smart card and in which determining whether the end user has access credentials to access the resource further comprises the user presenting the smart card to a smart card reader at the physical location.

3. A system for providing an end user access to a secure resource, the system comprising:

a resource access system in communication with a mobile network database;

an access database connected to and accessible by the resource access system, the resource access system configured to determine whether the end user has access credentials to access the secure resource based on information stored in the access database;

in which the resource access system is configured to communicate with the mobile network database to obtain subscriber data associated with a mobile device associated with the end user in response to the resource access system receiving a request from the user to access the secure resource;

in which the resource access system is configured to communicate with a backend system of a mobile network to obtain a cellular base station identity code associated with a mobile base station to which the mobile device, is currently connected and configured to verify that the cellular base station identity code identifies a mobile base station near the secure resource; and in which the resource access system is configured to map the subscriber data to the cellular base station identity code to verify that the mobile device is at a physical location near the secure resource.

4. The system of claim 3 in which the resource access system further comprises a smart card access system and the access database further comprises a smart card database, and in which the smart card access system maps the subscriber data associated with the mobile device with a smart card that is used to access the resource access system.

* * * * *

UNITED STATES PATENT AND TRADEMARK OFFICE
CERTIFICATE OF CORRECTION

PATENT NO. : 10,403,067 B2
APPLICATION NO. : 16/192606
DATED : September 3, 2019
INVENTOR(S) : D. Niles

Page 1 of 1

It is certified that error appears in the above-identified patent and that said Letters Patent is hereby corrected as shown below:

In the Claims

| Column | Line | Error |
|---|---|---|
| 14 (Claim 3) | 7 | "device, is currently" should read --device is currently-- |

Signed and Sealed this
Twenty-sixth Day of November, 2019

Andrei Iancu
*Director of the United States Patent and Trademark Office*